Oct. 7, 1969     E. A. VON SEGGERN ET AL     3,470,855
AIR VALVE ACTUATING MEANS AND METHOD FOR
SUPPLYING AUXILIARY AIR TO AN
INTERNAL COMBUSTION ENGINE
Filed June 26, 1967
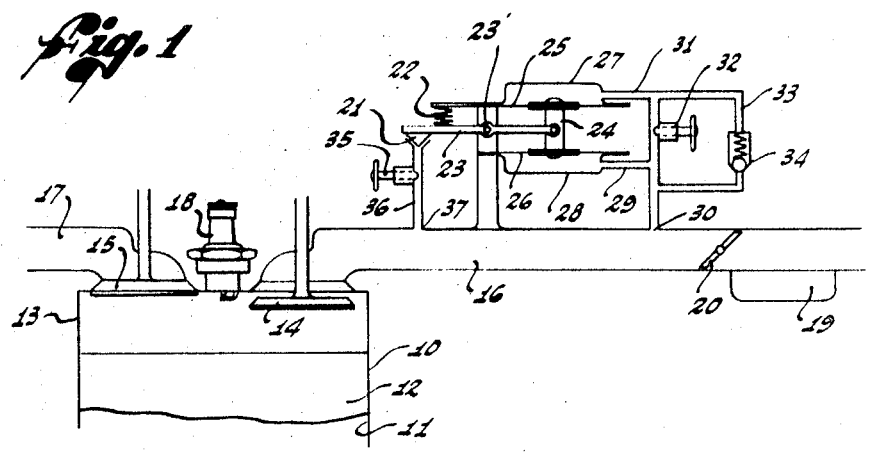
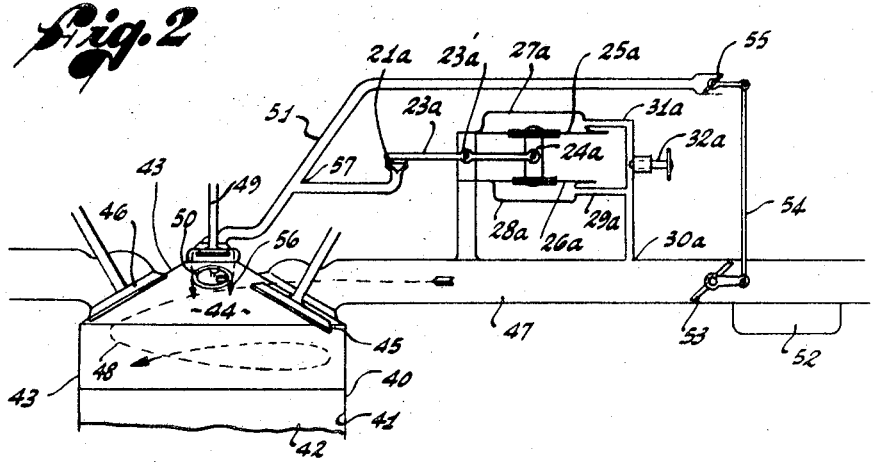
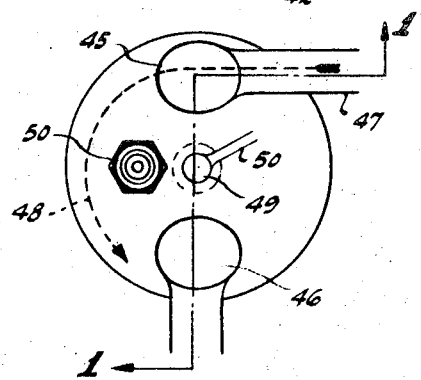
ERNEST A. VON SEGGERN
INVENTORS
BY Forrest J. Lilly
ATTORNEY

United States Patent Office 3,470,855
Patented Oct. 7, 1969

3,470,855
AIR VALVE ACTUATING MEANS AND METHOD FOR SUPPLYING AUXILIARY AIR TO AN INTERNAL COMBUSTION ENGINE
Ernest A. von Seggern, 1051 E. Angeleno, Burbank, Calif. 91501, and Henry E. von Seggern, Rte. 2, Box 1910, Escondido, Calif. 92025
Filed June 26, 1967, Ser. No. 648,575
Int. Cl. F02b 29/02
U.S. Cl. 123—97    7 Claims

ABSTRACT OF THE DISCLOSURE

An air valve is provided with suitable operating means for momentarily admitting auxiliary air to a gasoline engine to maintain a substantially uniform fuel-air ratio mixture in the engine during the period immediately following the closing of the carburetor throttle. The operating means are designed to open the air valve automatically for a duration directly proportional to the rate of pressure drop in the engine when the throttle is closed.

---

This invention relates to the method of operation of, and the actuating mechanism for, an auxiliary air valve for a spark ignition engine which supplies air to the combustion chamber during a limited time while the engine is decelerating. This air is supplied to the engine at a time when the control throttle is first closed and when fuel in transit in the intake manifold, and any fuel momentarily held on the walls of the intake manifold, or elsewhere in the fuel induction system is vaporized and delivered to the engine cylinder with insufficient air to provide normal combustion.

It is a general object of this invention to provide a means and method for supplying auxiliary air to a spark ignition, internal combustion engine during the period of deceleration to complete the combustion of excess fuel which enters the engine at this time with insufficient air for complete combustion. It is a further object to provide a method of supplying auxiliary air during deceleration to an engine employing excess air and a stratified and localized fuel-air mixture as described in our copending application entitled "Internal Combustion Engine and Process Utilizing Heated Auxiliary Air to Obtain Complete Combustion" Ser. No. 601,480, filed Dec. 13, 1966 now Patent No. 3,408,992. A further object is to provide a mechanism responsive to sudden decrease in pressure in the intake manifold which will momentarily admit air to the engine while a momentary over supply of fuel reaches the engine cylinder. Another object is to provide a mechanism which includes simple means for controlling the duration of open time of the valve and the rate of air admission.

Additional objects and features of the invention will be described in the specification in conjunction with the description of the invention.

In spark ignition gasoline engines, particularly those using carburetors and intake manifolds, there is a substantial quantity of fuel in transit between the carburetor throttle and the engine cylinder. This includes fuel which has dropped out of circulation and wets the manifold walls, as well as unvaporized liquid fuel droplets in the air stream. When the throttle is suddenly closed the pressure in the manifold drops very quickly, and this causes any excess liquid fuel to vaporize at once and pass on into the engine cylinder without sufficient air to insure complete combustion. This produces momentarily "rich" fuel mixtures which produce excessive CO and unburned hydrocarbons in the exhaust. A momentary excess of air supplied to the engine will alleviate this condition while the engine readjusts itself to normal steady state operation. The method is effective both in standard engines, and in those which employ auxiliary air in combination with localized fuel-air mixtures.

In the accompanying drawings, showing somewhat diagrammatically typical embodiments of the invention:

FIGURE 1 is a vertical cross-section of one cylinder and the intake manifold of what may be a multiple cylinder engine, and a cross-section of an auxiliary air valve and operating mechanism;

FIGURE 2 is a vertical cross-section of one cylinder and the intake manifold and auxiliary air supply system of what may be a multiple cylinder engine utilizing stratified fuel-air mixtures in combination with excess air according to the process described in our copending application referred to above; and FIGURE 3 is a plan view of the engine shown in FIGURE 2, showing the manifold orientation relative to the engine cylinder, and the type of mixture circulation induced in the cylinder during the intake and compression cycles.

The engine shown in FIGURE 1 is a substantially conventional valve-in-head four cycle engine, shown without cooling means or valve operating gear, but with an intake manifold and carburetor and auxiliary air valve and operating mechanism.

A cylinder block 10, having a cylinder bore 11 with reciprocating piston 12 therein, has a cylinder head 13 fastened onto the upper end thereof. Head 13 also includes valve seats for a conventional intake valve 14 and exhaust valve 15. These valves are operated in the conventional manner. An intake manifold 16 leads from the seat controlled by valve 14 and an exhaust manifold 17 leads from the seat controlled by valve 15. A spark plug 18 is located in the cylinder head 13.

A carburetor 19 of any conventional type, having a throttle 20 is fastened to the end of manifold 16. An auxiliary air inlet valve 21 is provided to admit air to manifold 16 at a point between said throttle 20 and intake valve 14 as shown. This valve is normally held closed by means of spring 22 and is adapted to be opened by lever 23, pivoted at 23a. The other end of lever 23 is attached, by means of rod 24, to the centers of elastically yieldable diaphragms 25 and 26. These diaphragms are enclosed on one side respectively by housings 27 and 28 as shown.

Housing 28 is connected to manifold 16 by an unrestricted passage 29 at a point 30 between throttle 20 and intake valve 14. Housing 27 is also connected to passage 29 by means of branch passage 31, but this passage is variably restricted by means of adjustable valve 32. Optionally, a third passage 33 may be provided which includes a check valve 34 and which by-passes the restrictive valve 32 as shown. The check valve is designed to permit a free flow of air from manifold 16 into housing 27, but prevents the reverse flow, forcing any flow in this direction, to pass through valve 32.

In operation, under any steady state condition in which the pressure in the manifold 16 is constant, the same pressure will be present in both housings 28 and 27, and the same force will be exerted on rod 24 by diaphragms 25 and 26, although in opposite directions, so that they cancel each other. It is assumed that the diaphragms have equal effective areas. Rod 24 is not acted on and spring 22 holds valve 21 in the closed position. Valve 32 is adjusted sufficiently open so that moderate changes in manifold pressure due to changes in the position of throttle 20, to vary the power output of the engine, do not actuate valve 21. A sudden closing of throttle 20, will, however, produce a sudden decrease in pressure in manifold 16 which is not immediately equalized in housings 28 and 27. The restricted flow through valve 32 acts to make the pressure fall more slowly in housing 27 than in housing 28 and there is then, momentarily, a greater pressure on diaphragm 25 than there is on diaphragm 26. By the differential pressures so created, diaphragm 25 then deflects away from its housing, while diaphragm 26 deflects toward its housing, causing lever 23 to move clockwise, and thereby open valve 21 and admit air to the manifold 16. As soon as the excess of air in housing 27 leaks out through valve 32 the initial pressure balance is restored, the diaphragms return, and valve 21 closes, returning the engine to normal operation. The quantity of air admitted to the manifold during the time valve 21 is open may be controlled by means of valve 35 in passage 36, which opens into manifold 16 at a point 37.

The temporary enrichment of the fuel-air mixture delivered to the engine when the throttle is suddenly closed is of about short duration, and the mechanism is adjusted so the valve 21 is held open only as long as this condition exists. Closing valve 32 more acts to increase the time required for the pressures on the diaphragms to equalize, and hence valve 21 is held open longer. Conversely opening valve 32 shortens the open time until a point is reached where it fails to open at all.

A sudden opening of throttle 20 produces a reverse action, i.e., the momentary pressure on diaphragm 26 is greater than on diaphragm 25 which acts to move lever 23 in the opposite direction and to close valve 21 more tightly than it is closed by spring 22. This is of no consequence as far as the valve is concerned, but if a sudden opening is followed at once by a sudden closing the valve fails to open because there is not yet sufficient air in housing 27 to produce the pressure required to open valve 21. The check valve 34 is provided to enable the pressures in housings 27 and 28 to equalize instantly when throttle 20 is opened and the pressures increase, but not so when the pressures suddenly decrease. Then check valve 34 closes and the air in housing 27 must slowly leak out through valve 32.

There are other ways in which the auxiliary air valve and its operating mechanism may be used on an engine. The engine shown in FIGURES 2 and 3 illustrates how the valve may be applied to an engine such as is described in our copending application referred to above, which utilizes a stratified fuel-air mixture in combination with excess air. This engine is shown with a cylinder block 40 having a cylinder bore 41 with reciprocating piston 42 therein and a cylinder head 43 fastened to the upper end thereof. This type of engine is usually made with a hemispherical combustion chamber 44 having an inclined intake valve 45 and exhaust valve 46 opening therein. The intake manifold 47 is oriented tangentially with respect to the cylinder 41 as shown in FIGURE 3 and is designed to direct the fuel-air mixture entering said cylinder from said manifold to flow about the central axis of said cylinder as shown by arrow 48. An auxiliary air admission valve 49 is provided near the apex of the combustion chamber 44 between said valves 45 and 46, and a spark plug 50 is located at one side thereof. An air intake manifold 51 is connected to the seat controlled by air valve 49 and a carburetor 52 of conventional design is connected to intake manifold 47. The throttle 53 of carburetor 52 is connected by link 54 to air control valve 55 in said air intake manifold 51. The throttle and valve are connected so that they open and close in unison.

The basic operation of this engine depends on establishing a stratified fuel-air mixture and excess air in the cylinder at the time of ignition. During the intake cycle the fuel-air mixture is directed to flow about the central length axis of the cylinder as shown by flow line 48, while excess air is being admitted through valve 49 into the top of the cylinder along the axis thereof as shown by flow lines 56. Toward the end of the compression cycle, the peripheral fuel-air mixture is ignited by means of spark plug 50, while the excess air is still localized along the axis of the cylinder. Combustion of the fuel mixture heats, compresses, and then mixes the heated air with the burning fuel early in the power cycle, whereby the excess air acts to complete the combustion before expansion and cooling of the gases.

Enough excess air is supplied at all loads to effectively complete the combustion, under substantially steady state conditions. When the throttle is quickly closed, and an excessive quantity of fuel relative to the air is momentarily supplied to the cylinder, the normal excess of air may be insufficient to complete the reaction. The auxiliary air valve 21 and actuating means already described in FIGURE 1, may be connected to the engine in the same manner, i.e., to the intake manifold 47, to supply extra air directly to the fuel mixture in the manifold, or it may be connected, as shown in FIGURE 2, to the air manifold 51 at a point 57 between air intake valve 49 and air control valve 55. The extra air joins with that already supplied to complete the combustion of the fuel mixture.

The operation of the air valve 21a and all associated parts, as designated by the same numerals as in FIGURE 1, but with subscript *a* added, is identical to that already described. The method of operation of the auxiliary air as supplied to the engine shown in FIGURES 1 and 2 is not, however, identical. In the first engine the air added changes the fuel-air mixture ratio before ignition, whereas in the second engine the change occurs only after ignition. Due to the charge stratification the quantity of air which may be added to the second engine, in excess of stoichiometric requirements, is very large, while that which may be added to the first engine is limited to quantities which produce ignitable fuel-air mixtures. The latitude of control of the system on the second engine is therefore greater than it is on the first engine.

The valve operating mechanism has been modified in FIGURE 2 in a manner to eliminate the need for the spring 22, shown in FIG. 1. Diaphragm 26a is shown with an area less than that of diaphragm 25a. This difference in area produces a net force which acts to close valve 21a when the pressures in housings 27a and 28a are equal and less than atmospheric pressure.

We claim:
1. In an internal combustion engine of the spark ignition type employing an intake manifold and fuel-air mixture supply means including a throttle, the method of minimizing the transient over-supply of fuel to the engine immediately following sudden closing of the throttle, which includes as steps:
   momentarily supplying air to said engine in excess of that normally supplied in substantially instant response to a sudden decrease in manifold pressure by operating an air supply means by a force generated by a transient unbalance and delayed equalization of pressures in a differential pressure responsive controller acted on by said manifold pressure both directly and through a restriction.

2. In an internal combustion engine of the spark ignition type having an intake manifold and a carburetor, including a throttle, for supplying a fuel-air mixture to said manifold, the combination of:
   a first diaphragm;
   a first diaphragm housing which encloses said first diaphragm on one side thereof;
   a second diaphragm;
   a second diaphragm housing which encloses said second diaphragm on one side thereof;
   a first open passage means connecting said first diaphragm housing to said intake manifold;
   a second open passage means connecting said second diaphragm housing to said intake manifold;
   flow restricting means in combination with said second passage to restrict the flow of air therethrough;
   link means connecting said first and said second diaphragms together at substantially their centers and arranged so that when one diaphragm moves toward its housing the other diaphragm moves away from its housing, and vice versa;

air valve means connected to said link means in a manner so that when said first diaphragm moves towards its housing said valve is opened, and vice versa; and passage means connecting said air valve to said engine so that when said valve is open, air enters said engine in addition to the fuel-air mixture supplied by said carburetor and said intake manifold.

3. A combination as in claim 2 in which the effective area of the second diaphragm is larger than the effective area of the first diaphragm.

4. A combination as in claim 2, in which a check valve by-passes the flow restricting means in said second passage means to permit flow from said manifold into said second diaphragm housing but to prevent flow from said housing to said manifold.

5. A combination as in claim 2 but in which said passage means connects said air valve to said intake manifold at a point between said throttle and said engine.

6. A combination as in claim 2 but in which said engine includes an auxiliary air supply manifold substantially independent of said intake manifold for supplying excess air to said engine in a stratified charge in the combustion chamber, and in which said passage means connects said air valve to said auxiliary air supply manifold.

7. A combination as in claim 2, in which the passage means connecting said air valve to said engine includes flow restricting means to regulate the quantity of air admitted to said engine while said valve is open.

References Cited

UNITED STATES PATENTS 2,386,340  10/1945  Olson.
2,443,562  6/1948   Hieger.
2,466,090  4/1949   Fageol.

MEYER PERLIN, Primary Examiner